United States Patent Office 3,484,866
Patented Dec. 16, 1969

3,484,866
DIRECT CURRENT HIGH VOLTAGE GENERATOR
Osamu Nakamura, Yasushi Hinaga, and Makoto Yamamoto, Tokyo, and Susumu Ohta, Tadashi Kawai, and Kenichi Mizusawa, Kyoto-shi, Kyoto, Japan, assignors to Nihon Deshi Kabushiki Kaisha, Tokyo, and Nissin Electric Co., Ltd., Kyoto-shi, Kyoto, Japan, both corporations of Japan
Filed Apr. 22, 1968, Ser. No. 722,985
Claims priority, application Japan, Apr. 26, 1967, 42/26,474
Int. Cl. H02m 7/52
U.S. Cl. 321—15                                    4 Claims

ABSTRACT OF THE DISCLOSURE

A direct current high voltage generator that utilizes a Cockcroft-Walton type voltage multiplying rectification circuit having at least two AC capacitor columns and one DC capacitor column, and means for adjusting the voltage and phase of the AC input power to cancel the ripples induced between the AC capacitor columns and the load through stray capacitance.

---

Our invention relates to a means for reducing induced ripples from a voltage multiplying rectifier. In a high voltage DC source used as an accelerating voltage source, it is required that the voltage be regulated within prescribed limits. For example, in electron microscopes, a voltage regulation of less than $10^{-5}$ is required.

Generally, a periodic voltage fluctuation, viz. "ripple," is generated in the rectification circuit which can be reduced by utilizing a filter circuit. However, to ensure instrument compactness, the high voltage rectification circuit, the filter circuit, and accelerating tubes must be closely positioned in a sealed tank filled with insulating oil or gas. When so positioned, a ripple is induced into the load, usually particle accelerators, from stray capacitances that exist between these circuits. The ripple induced from stray capacitance cannot be eliminated with the use of filter circuits.

Consequently, various methods have been developed to reduce the ripple. These methods include:

(1) utilizing a shielding in the space between the rectification and filter circuits, and between the filter circuit and the load;

(2) symmetrically arranging two AC input circuits with respect to the output circuit, which includes a load, to cancel the ripples induced from the two AC input circuits at the output circuit; and (3) providing an additional AC power source between the low voltage terminal of the DC output and ground that generates the same frequency and out-of-phase voltage as the ripple to cancel the ripple by adjusting the output voltage of the additional AC power source.

Each of the above methods, however, possesses the following disadvantages:

(1) the first method is limited to an output of about 200 kilovolts due to the limitations of shielding techniques;

(2) the second method has proven very difficult to put into effect due to difficulties involved in the construction of apparatus with sufficient mechanical and electrical symmetry to sufficiently eliminate the ripple content; and (3) the third method is extremely troublesome because the additional AC voltage requires an adjustment at each variation of the DC high voltage-AC input voltage.

Our invention provides a novel method for eliminating ripple while at the same time overcoming the above-cited disadvantages.

To eliminate the induced voltage fluctuations, ripple, we have invented a novel high voltage generator. The generator is, generally, of the Cockcroft-Walton type and includes at least one DC capacitor column having a plurality of capacitors and at least two AC capacitor columns, each of which includes a plurality of capacitors. An AC generating circuit is connected to each AC column. At least one of the generating circuits has means for adjusting output voltage and phase components. By the proper adjustment of these components the induced ripples can be eliminated by eliminating the stray capacitance between the columns and load.

The present invention will be more fully understood by reading the following detailed description in conjunction with the accompanying drawings, in which.

Figure 1:
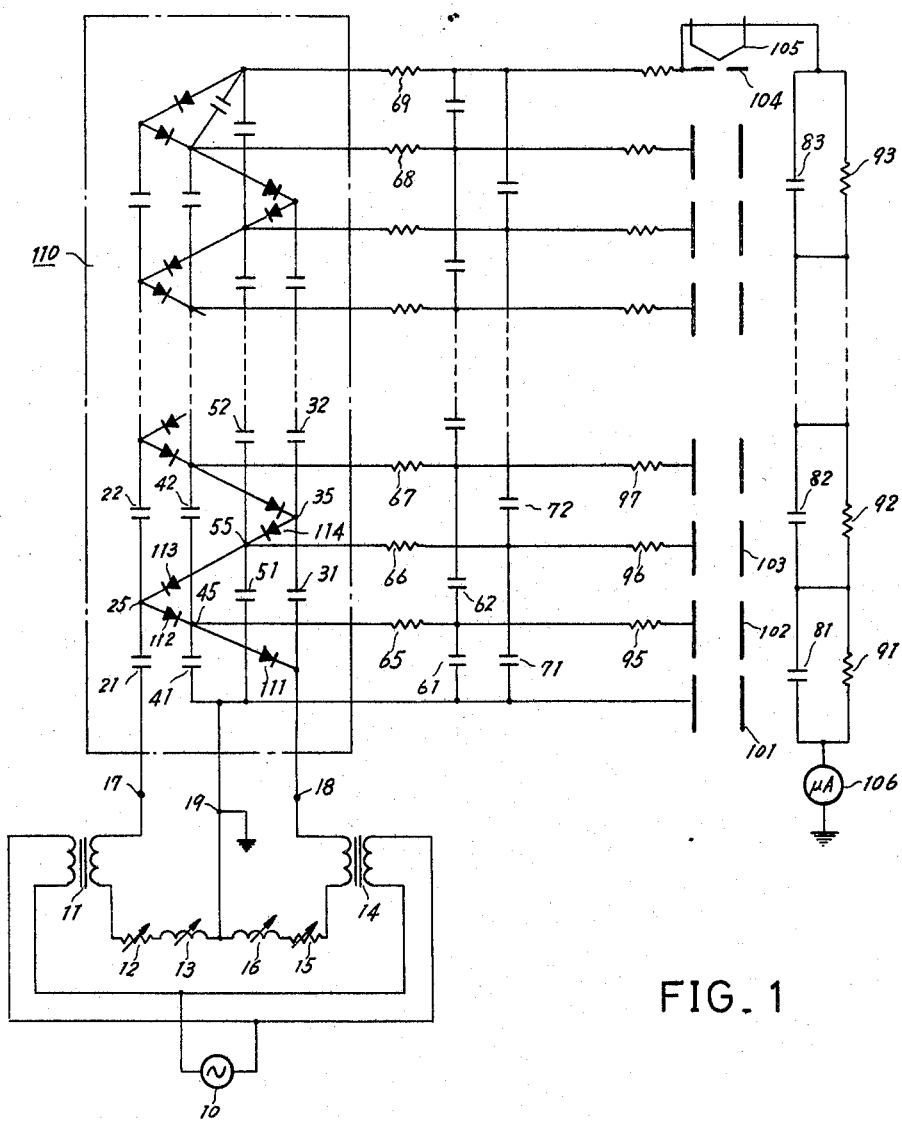
FIG. 1 is a schematic diagram of an accelerating power source for an electron microscope embodying the present invention.

Referring to FIG. 1, the electric power generated at the AC power source 10 is fed into a divided Cockcroft-Walton circuit 110 through a first AC generating circuit comprising a booster transformer 11, a variable resistor 12, and a variable inductance element 13, and a second AC generating circuit comprising a booster transformer 14, a variable resistor 15 and a variable inductance element 16. First and second generating circuits have output terminals 17 and 18, respectively, and are connected to a common ground terminal 19. These generating circuits are designed to be 180° out-of-phase with each other.

The divided Cockcroft-Walton type voltage multiplying circuit has two outputs per stage and comprises four capacitor columns. The two outer columns or AC capacitor columns are made up of series capacitors 21, 22, etc. and 31, 32, etc., respectively, and the two inner or DC capacitor columns comprise series capacitors 41, 42, etc. and 51, 52, etc. respectively. Diodes 111, 112, 113, 114, etc. are arranged between the columns, as shown in FIG. 1. Since the divided Cockcroft-Walton type circuit is new, a brief description of its operative principles is included.

Assuming that the voltage generated across terminals 17 and 19 by the first AC generating circuit is $E \sin \omega t$ and the voltage generated across terminals 18 and 19 by the second AC generator circuit is $-E \sin \omega t$, the electric potential at 18 (see FIG. 1) is $-E \sin \omega t$. Furthermore, since this voltage is applied to capacitor 41 through diode 111, the potential at 45 becomes $-E$. This voltage is applied to capacitor 21 through diode 112 and, at the same time, voltage $E \sin \omega t$ is applied to the ground side of the capacitor to provide a terminal voltage charge of 2E. Accordingly, the potential at 25 becomes $-2E + E \sin \omega t$. Since the voltage $-2E + E \sin \omega t$ is applied to capacitor 51 from point 25 through diode 113, the terminal voltage of capacitor 51 becomes 3E and the potential at point 55 becomes $-3E$. This voltage is applied to capacitor 31 through diode 114, and simultaneously therewith, voltage $-E \sin \omega t$ is applied to the ground side of the capacitor to provide a terminal voltage charge of 4E. The potential at point 35 thereby becomes $-4E - E \sin \omega t$.

Since the successive stages of the Cockcroft-Walton circuit operate in the same way as the first stage just described, it is clear that DC voltage outputs of $-E$, $-3E$, −5E, −7E, etc. are produced at the connecting points along the DC capacitor columns.

When positive high voltages are required, they can be obtained by changing the direction of the diodes.

The DC output voltages generated at 45, 55, etc. are fed into accelerating tubes 102, 103, etc., respectively, through the filter circuit and protective resistors 95, 96, 97, etc. The filter circuits comprise resistors 69, etc., capacitors 61, 62, etc., and capacitors 71, 72, etc. Resistors 65, 66, 67 . . . 68 feed the DC potential to each filter capacitor. The maximum negative high voltage applied to accelerating tube 104 is measured by microammeter 106 through the voltage detecting circuit that includes capacitors 81, 82, 83, etc., and resistors 91, 92, 93, etc.

By virtue of this arrangement, the electrons emitted from filament 105 are successively accelerated by accelerating tubes 104 . . . 103, 102, and grounded tube 101.

Figure 2:
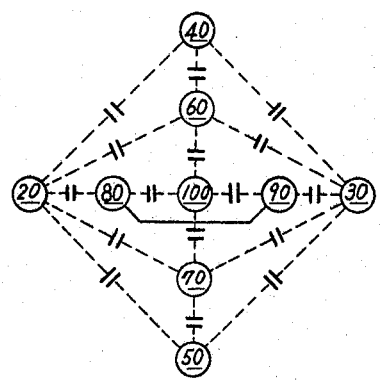
FIG. 2 is a plan view of the embodiment shown in FIG. 1.

FIG. 2 is a plan view arrangement of the parts shown in FIG. 1 wherein the transformers, diodes, and resistors have been omitted for the sake of clarity. As shown, first and second AC capacitor columns 20 and 30, respectively, are symmetrically positioned about accelerating tube 100 as are first and second DC capacitor columns 40 and 50, respectively. Filter circuit capacitors 60 and 70 are also symmetrically positioned. The voltage detecting circuit capacitors 80 and the voltage detecting circuit resistors 90 are also symmetrically positioned about the accelerating tube 100. The capacitors interconnecting the above assemblies are shown by dotted lines and are, in actually, stray capacitances.

Since the AC input power is applied to AC capacitor columns 20 and 30, ripple is induced through the stray capacitances into the output circuit comprising filter capacitors 60 and 70, voltage detecting capacitors 80, voltage detecting resistors 90 and accelerating tube 100. To prevent the ripple induction, it is necessary to design an apparatus wherein the stray capacitances are symmetrical with respect to the output circuit and wherein the two AC input voltages are equal and out-of-phase. If this can be achieved, the ripples generated by the two AC capacitor columns cancel each other prior to entering the output circuit.

Heretofore, however, it has not been possible to design an apparatus wherein ripple is effectively eliminated. We have overcome the problem of ripple by inserting variable inductance element 13 and variable resistor 12 between the secondary winding of booster transformer 11 and the ground, and variable inductance element 16 and variable resistor 15 between the secondary winding of booster transformer 14 and the ground (see FIG. 1).

Figure 3:
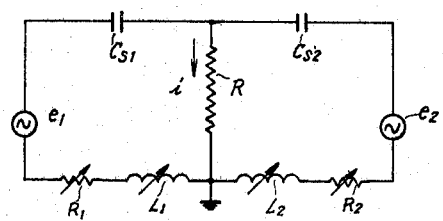
FIG. 3 is an equivalent circuit illustrating the embodiment shown in FIG. 1.

Referring to FIG. 3, which shows the equivalent circuit of the Cockcroft-Walton circuit represented in FIG. 1, R represents the output circuit, $C_{s1}$ the total stray capacity between the first AC capacitor column 20 and the output circuit, $C_{s2}$ represents the total stray capacity between the second AC capacitor column 30 and the output circuit, $e_1$ and $e_2$ the output voltages of booster transformers 11 and 14, respectively, $R_1$ and $R_2$ represent the resistances of variable resistors 12 and 15 and $L_1$ and $L_2$ the reactances of the variable inductance elements 13 and 16.

In this arrangement, the ripple current $i$, flowing through the output circuit R becomes zero when $$e_1 Z_2 = e_2 Z_1 \quad (1)$$

where where $Z_1 = R_1 + j\left(\omega L_1 - \dfrac{1}{\omega C_{s1}}\right)$ (2)

$Z_2 = R_2 + j\left(\omega L_1 - \dfrac{1}{\omega C_{s2}}\right)$ (3)

where $\omega$=the angular frequency of the AC inputs.

Thus, under practical conditions, where $e_1$ is not equal to $e_2$ and $C_{s1}$ is not equal to $C_{s2}$, the condition of no ripple current, can be located simply by adjusting $R_1$, $L_1$ and $R_2$, $L_2$.

In the accelerating voltage source for the electron microscope shown in FIG. 1, we have succeeded in reducing the ripple content to about 2 v. at an accelerating voltage of 1000 kv. This represents a voltage regulation in the order of approximately $2 \times 10^{-6}$.

Figure 4:
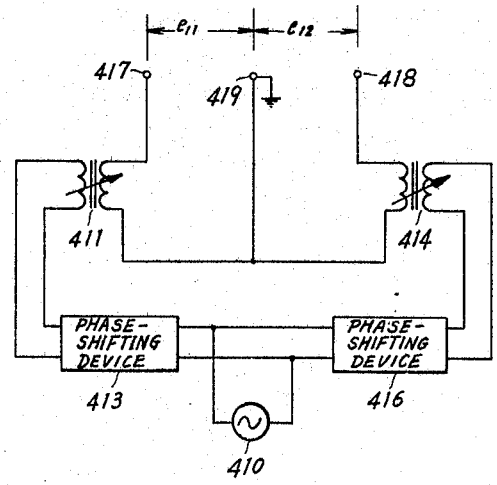
FIG. 4 is a schematic diagram of another embodiment of our invention utilizing a phase-shifting device.

In order to satisfy Equation 1, a variable capacitor can be used instead of a variable inductance element. Or alternatively, the same result can be obtained by adjusting either impedance $Z_1$ or $Z_2$. In other words, it is possible to arrange the adjustable components either in the first AC generating circuit or the second AC generating circuit. Furthermore, in the Cockcroft-Walton circuit, since the adjustment of resistance and inductance is, in effect, equal to that of AC input voltage and phase, a further embodiment of this invention is possible as shown by FIG. 4.

In this embodiment, the power generated at the AC power source 410 is fed into the Cockcroft-Walton type circuit (not shown) through the first AC generating circuit which consists of a phase-shifting device 413 and a variable transformer 411, and the second AC generating circuit comprises phase-shifting device 416 and variable transformer 414.

In this arrangement, ripples developed by the output voltage $e_{11}$ across terminal 417 and ground terminal 419, and the output voltage $e_{12}$ across terminal 418 and ground terminal 419, are cancelled by adjusting the voltages and phases of $e_{11}$ and $e_{12}$. In the first AC generating circuit, the output voltage of $e_{11}$ is adjusted by the variable transformer 411, and the phase of $e_{12}$ is adjusted by the phase-shifting device 413 which is in circuit with the primary winding of the said device. The same procedure applies to the second AC generating circuit.

Finally, in addition to the divided type Cockcroft-Walton circuit, the conventional full wave type Cockcroft-Walton circuit consisting of two AC capacitor columns and one DC capacitor column plus diodes, can be equally applied to this invention.

We claim:

1. A high voltage DC generator of the Cockcroft-Walton type for the conversion of low AC voltage to high DC voltage without induced ripple, comprising:
   (A) at least one DC capacitor column having a plurality of capacitors connected in series;
   (B) a plurality of AC capacitor columns, each having a plurality of capacitors connected in series;
   (C) a circuit having diodes for relating said AC column to said DC columns;
   (D) an AC generating circuit for each of said AC capacitor columns, each such circuit having an output terminal connected to one of the AC columns and to a ground; and,
   (E) means for adjusting the output voltage and phase of at least one of said generating circuits to cancel ripple induced by stray capacitance between the AC columns and a load.

2. A high voltage DC generator as set forth in claim 1 wherein the means for adjusting output voltage and phase comprises:
   (A) a booster transformer;
   (B) a variable resistor connected to the secondary winding of said transformer; and,
   (C) a variable inductance connected to the secondary winding of said transformer.

3. A high voltage DC generator as set forth in claim 1 wherein the means for adjusting output voltage and phase comprises:
   (A) a booster transformer;
   (B) a variable resistor connected to the secondary winding of said transformer; and,
   (C) a variable capacitor connected to the secondary winding of said transformer.

4. A high voltage DC generator as set forth in claim 1 wherein the means for adjusting the output voltage and phase comprises a variable transformer and phase-shifting means connected to the primary winding of said transformer.

References Cited
UNITED STATES PATENTS

| | | | |
|---|---|---|---|
| 2,772,371 | 11/1956 | Denton | 321—15 XR |
| 3,036,259 | 5/1962 | Heilpern | 321—15 |
| 3,320,513 | 5/1967 | Cleland | 321—15 |
| 3,418,555 | 12/1968 | Jockel | 321—15 |

LEE T. HIX, Primary Examiner

W. M. SHOOP, JR., Assistant Examiner

U.S. Cl. X.R.

307—110